(12) United States Patent
Wells et al.

(10) Patent No.: US 12,440,267 B2
(45) Date of Patent: Oct. 14, 2025

(54) SYSTEM FOR FORMING A FISTULA BETWEEN TWO VESSELS

(71) Applicant: CLEARSTREAM TECHNOLOGIES LIMITED, Enniscorthy (IE)

(72) Inventors: Jakob Wells, Scottsdale, AZ (US); John O'Shea, Enniscorthy (IE); Michael Whelan, Enniscorthy (IE)

(73) Assignee: CLEARSTREAM TECHNOLOGIES LIMITED, Enniscorthy (IE)

( * ) Notice: Subject to any disclaimer, the term of this patent is extended or adjusted under 35 U.S.C. 154(b) by 0 days.

(21) Appl. No.: 18/294,411

(22) PCT Filed: Jul. 13, 2022

(86) PCT No.: PCT/EP2022/069607
§ 371 (c)(1),
(2) Date: Feb. 1, 2024

(87) PCT Pub. No.: WO2024/012669
PCT Pub. Date: Jan. 18, 2024

(65) Prior Publication Data
US 2025/0134584 A1 May 1, 2025

(51) Int. Cl.
*A61B 18/14* (2006.01)
*A61B 18/00* (2006.01)

(52) U.S. Cl.
CPC .............. *A61B 18/1492* (2013.01); *A61B 2018/00184* (2013.01); *A61B 2018/00404* (2013.01); *A61B 2018/00601* (2013.01); *A61B 2018/1475* (2013.01)

(58) Field of Classification Search
CPC ...... A61B 18/1492; A61B 2018/00184; A61B 2018/00404; A61B 2018/00601; A61B 2018/1475
See application file for complete search history.

(56) References Cited

U.S. PATENT DOCUMENTS

| 5,658,301 A | 8/1997 | Lemaitre |
| 2004/0204730 A1 | 10/2004 | Goldberg |
| 2010/0286719 A1 | 11/2010 | Paul |
| 2012/0302935 A1 | 11/2012 | Miller |

(Continued)

FOREIGN PATENT DOCUMENTS

| EP | 1109496 A2 | 6/2001 |
| FR | 2903292 A1 | 1/2008 |

(Continued)

*Primary Examiner* — Linda C Dvorak
*Assistant Examiner* — Abigail Bock
(74) *Attorney, Agent, or Firm* — Dickinson Wright PLLC; Andrew D. Dorisio; Nicholas P. Coleman

(57) ABSTRACT

A system for forming a fistula between two vessels, the system comprising a first catheter. The first catheter comprises a catheter shaft with a housing. The first catheter further comprises an electrode disposed at least partially within the housing, the electrode comprising a distal portion, a proximal portion and an intermediate portion therebetween for contacting a vessel wall and forming the fistula. The first catheter further comprises a plurality of teeth for cutting a venous valve, wherein the plurality of teeth extend radially from the catheter shaft and are angled in a proximal direction.

20 Claims, 8 Drawing Sheets

(56) References Cited

U.S. PATENT DOCUMENTS

| | | | |
|---|---|---|---|
| 2015/0366580 A1* | 12/2015 | Lenihan | A61B 17/3403 604/8 |
| 2017/0202603 A1* | 7/2017 | Cohn | A61F 2/2475 |
| 2018/0098777 A1 | 4/2018 | Gabbay | |
| 2020/0289149 A1 | 9/2020 | Cohn | |
| 2021/0220616 A1 | 7/2021 | Deaton | |
| 2021/0267675 A1* | 9/2021 | Pate | A61B 6/504 |

FOREIGN PATENT DOCUMENTS

| | | |
|---|---|---|
| WO | 03011143 A2 | 2/2003 |
| WO | 2020242491 A1 | 12/2020 |
| WO | 21108600 A1 | 6/2021 |
| WO | 21113785 A1 | 6/2021 |
| WO | 21188609 A2 | 9/2021 |

\* cited by examiner

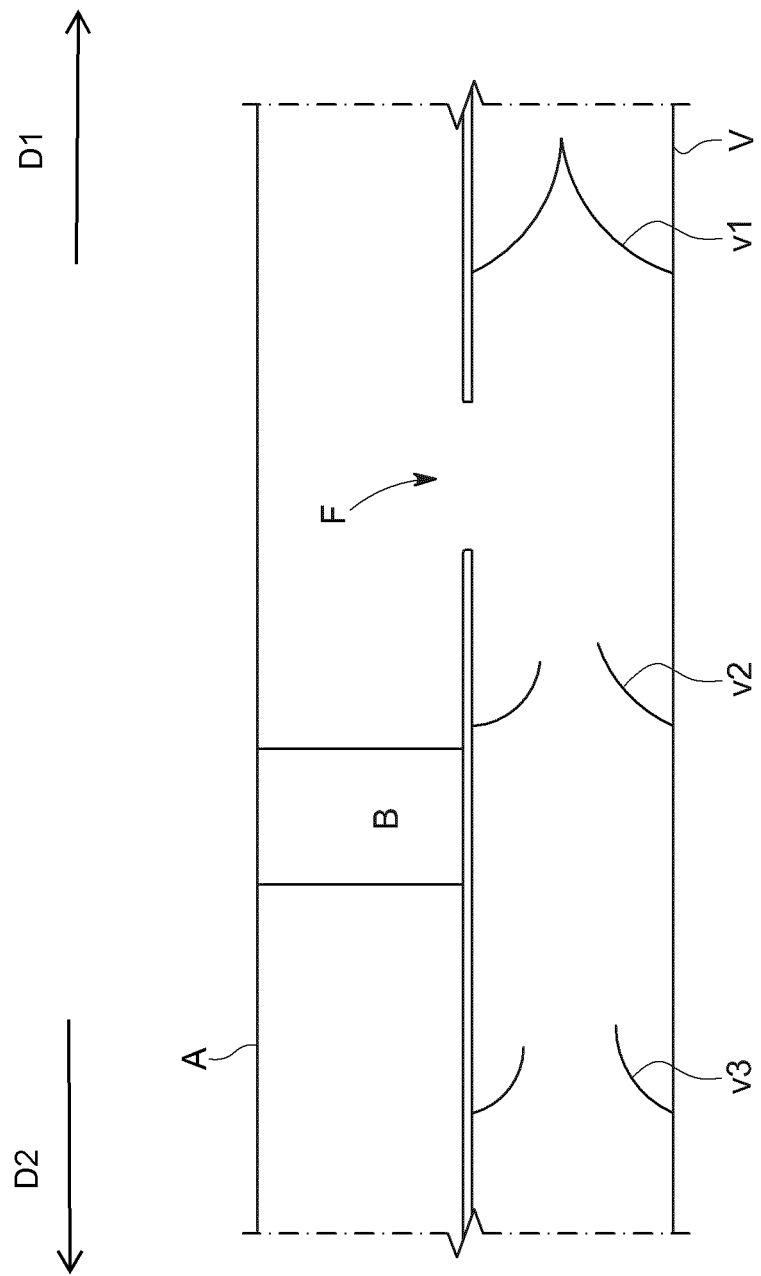

SYSTEM FOR FORMING A FISTULA BETWEEN TWO VESSELS

TECHNICAL FIELD

The present disclosure relates to a system for forming a fistula between two vessels, and a method of arterializing a vein.

BACKGROUND

Peripheral arterial disease (PAD) can result from the occlusion of arteries in the legs and lower extremities such as the feet. Typically, such occlusion is brought about by atherosclerosis, whereby calcified plaque deposited on the walls of an arterial vessel causes narrowing and blockage of the vessel lumen. Severe cases of arterial blockage in the lower extremities can lead to critical limb ischemia (CLI), a chronic condition characterised by y severe pain and slow healing of wounds in the affected extremities due to poor circulation of blood. Left untreated, the patient may suffer loss of limbs due of the need to undergo amputation.

Treatment of such diseased arteries may include angioplasty or atherectomy. However, n some circumstances, these treatments are unsuitable, and an alternative solution is necessary. One such alternative solution is deep vein arterialisation (DVA), whereby blood flow is routed from the diseased artery to a nearby deep vein in order to supply the extremity with blood. Another possible treatment is an endovascular bypass procedure, whereby blood flow is routed out of the artery and back into the artery by a conduit that circumvents the blockage. That conduit may, for example, be a stent graft placed within an adjacent vein.

The process of routing the blood from the artery to an adjacent vein involves the formation of a fistula, which is a passageway connecting the two vessels.

Further, in order for a deep vein arterialization procedure or an endovascular bypass procedure to be effective, the venous valves that normally hinder retrograde blood flow must be made incompetent.

It is known in the art to perform DVA or endovascular bypass procedures using a catheter for forming a fistula and a separate catheter for valve destruction. However, this approach may be limited, for example, by the complexity of the procedure which necessitates multiple steps involving multiple catheters.

In view of the above, there is a need for an improved catheter which can effectively form a fistula between two vessels and destroy venous valves.

There is further a need in the art for a new catheter which reduces the treatment time for a DVA or endovascular bypass procedure and makes the procedures simpler by eliminating the need for multiple catheters and reduces the number of steps in the procedure.

SUMMARY

In a first aspect of the present disclosure, there is provided a system for forming a fistula between two vessels, the system comprising a first catheter. The first catheter comprises a catheter shaft with a housing. The first catheter further comprises an electrode disposed at least partially within the housing, the electrode comprising a distal portion, a proximal portion and an intermediate portion therebetween for contacting a vessel a vessel wall and forming the fistula. The first catheter further comprises a plurality of teeth for cutting a venous valve, wherein the plurality of teeth extend radially from the catheter shaft and are angled in a proximal direction.

In some embodiments, this may result in a system which can effectively form a fistula between two vessels and destroy venous valves.

In some embodiments, this may further result in a system which reduces the treatment time for a DVA or endovascular bypass procedure and makes the procedures simpler.

Throughout this disclosure, the terms "proximal" and "distal" refer to the proximal and distal directions in relation to the catheter, unless otherwise specified. In that case, "proximal" refers to a point on the catheter which is intended to be closer to a physician when the catheter is in use, while "distal" refers to a point on the catheter which is intended to be further away from a physician when the catheter is in use.

The plurality of teeth may be positioned distally of the electrode.

In some embodiments, this may result in more effective destruction of venous valves.

The plurality of teeth may comprise in the range of 2 to 8 teeth, The plurality of teeth may comprise in the range of 3 to 6 teeth.

In some embodiments, this may result in effective destruction of venous valves.

The plurality teeth may be spaced around the circumference of the catheter shaft.

In some embodiments, this may allow the plurality of teeth to engage a greater portion of the venous valve and result in more effective valve destruction.

The plurality of teeth may be positioned at the same longitudinal position as one another.

In some embodiments, this may allow the plurality of teeth to engage the valve simultaneously and result in more effective valve destruction.

The plurality of teeth may be fang-shaped.

In some embodiments, this may result in more effective destruction of venous valves and also may prevent damage to the vessel walls.

Throughout this disclosure, the term "fang-shaped" will be used to refer to a tapered shape with a pointed end.

The plurality of fang-shaped teeth may have a radially outer surface and radially inner surface which meet at a pointed end.

In some embodiments, this may allow the fang-shaped teeth to better engage the valve tissue. In some embodiments, this may also minimise vessel damage.

The pointed end may be a proximal pointed end.

The radially outer surface may be curved.

In some embodiments, this may minimise damage to the vessel walls.

The radially outer surface may be curved such that the pointed end is positioned radially closer to the catheter shaft than a top portion of the radially outer surface.

The radially inner surface may comprise a cutting edge or a serrated edge.

In some embodiments, this may result in effective valve destruction while minimising damage to the vessel wall.

The pointed end of the fang-shaped teeth may be an atraumatic pointed end.

In some embodiments, this may minimise damage to the vessel walls.

The pointed end of the fang-shaped teeth may be a sharp pointed end for piercing a venous valve.

In some embodiments, this may result in more effective valve destruction.

The plurality of teeth may have an abrasive surface.

In some embodiments, this may result in more effective valve destruction.

The first catheter may comprise a rapid exchange distal tip.

In some embodiments, this may allow the catheter to be exchanged more easily and efficiently.

The plurality of teeth may be positioned on the rapid exchange distal tip or between the housing and the rapid exchange distal tip.

The plurality of teeth may be positioned on the housing.

The first catheter may further comprise a convex stabilizing element, extending from the housing.

In some embodiments, this may help stabilise the electrode during the fistula formation process and may also help stabilise the first catheter during the valve destruction process to result in more effective valve destruction.

The convex stabilizing element may be positioned opposite the electrode.

In some embodiments, this may result in more effective stabilization of the first catheter.

The electrode may have a radially expanded configuration and a radially contracted configuration.

In some embodiments, this may allow the profile of the catheter to be reduced for easier movement through a vessel.

In some embodiments, this may allow the electrode to be expanded and result in better fistula formation.

Throughout this description, the 'radially expanded configuration' of an element refers to a configuration where the element extends radially further from the housing than in the 'radially contracted configuration'.

The electrode may comprise a leaf spring.

In some embodiments, this may allow the electrode to be bent and flexed without breaking.

In some embodiments, this may allow the electrode to more easily move between the radially contracted configuration and the radially expanded configuration.

Throughout this disclosure, the term 'leaf spring' is used to refer to a flexible curved strip of material which can be bent but will regain its original shape when released.

The electrode may have a convex portion.

In some embodiments, this may result in better fistula formation.

The electrode may comprise a ribbon wire.

In some embodiments, this may result in better fistula formation.

A distal end of the electrode may be longitudinally moveable within the housing.

In some embodiments, this may allow the electrode to more easily move between the radially expanded configuration and the radially contracted configuration.

The housing may be at least partially made from a ceramic material.

In some embodiments, this may allow the housing to better withstand the heat and plasma generated by the electrode.

The system may further comprise a second catheter comprising a second housing and a backstop for the electrode.

In some embodiments, this may allow the electrode to press against a backstop which may result in better fistula formation.

The first catheter and the second catheter may each comprise one or more sets of magnets positioned to align the electrode with the backstop.

In some embodiments, this may result in simple and accurate alignment of the electrode with the backstop.

The system may further comprise a distal set of magnets disposed on the second catheter, distally of the second housing. The system may further comprise a proximal set of magnets disposed on the second catheter, proximally of the second housing.

The system may further comprise a distal set of magnets disposed on the first catheter, distally of the first housing. The system may further comprise a proximal set of magnets disposed on the first catheter, proximally of the first housing.

The backstop may be a recessed backstop which has a portion shaped complementary to the electrode.

In some embodiments, this may allow the electrode to better engage with the backstop and result in better fistula formation.

The backstop may have a concave portion.

The backstop may be non-conductive.

The backstop may be at least partly made from a ceramic material.

In some embodiments, this may allow the backstop to better withstand the heat and plasma generated by the electrode.

The system may further comprise a radiofrequency generator for supplying radiofrequency energy to the electrode.

In a second aspect of the present disclosure, there is provided a method of arterializing a vein comprising: inserting a first catheter into a vein through an access site, the first catheter having a housing, an electrode disposed at least partially within the housing, and a plurality of teeth angled in a proximal direction; inserting a second catheter into an artery through a second access site, the second catheter comprising a second housing with a backstop; advancing the first and second catheter to a treatment site where a fistula is to be formed; supplying RF energy to the electrode to form a fistula between the artery and vein; destroying one or more valves in the vein by pulling the first catheter in a distal direction such that the plurality of teeth engage and cut the one or more valves.

BRIEF DESCRIPTION OF THE DRAWINGS

To enable better understanding of the present disclosure, and to show how the same may be carried into effect, reference will now be made, by way of example only, to the accompanying drawings, in which:

FIG. 3A-E illustrate the steps of a method of using the system of FIG. 1 to form a fistula between an artery and a vein and destroy the valves in the vein.

DETAILED DESCRIPTION

Figure 1:
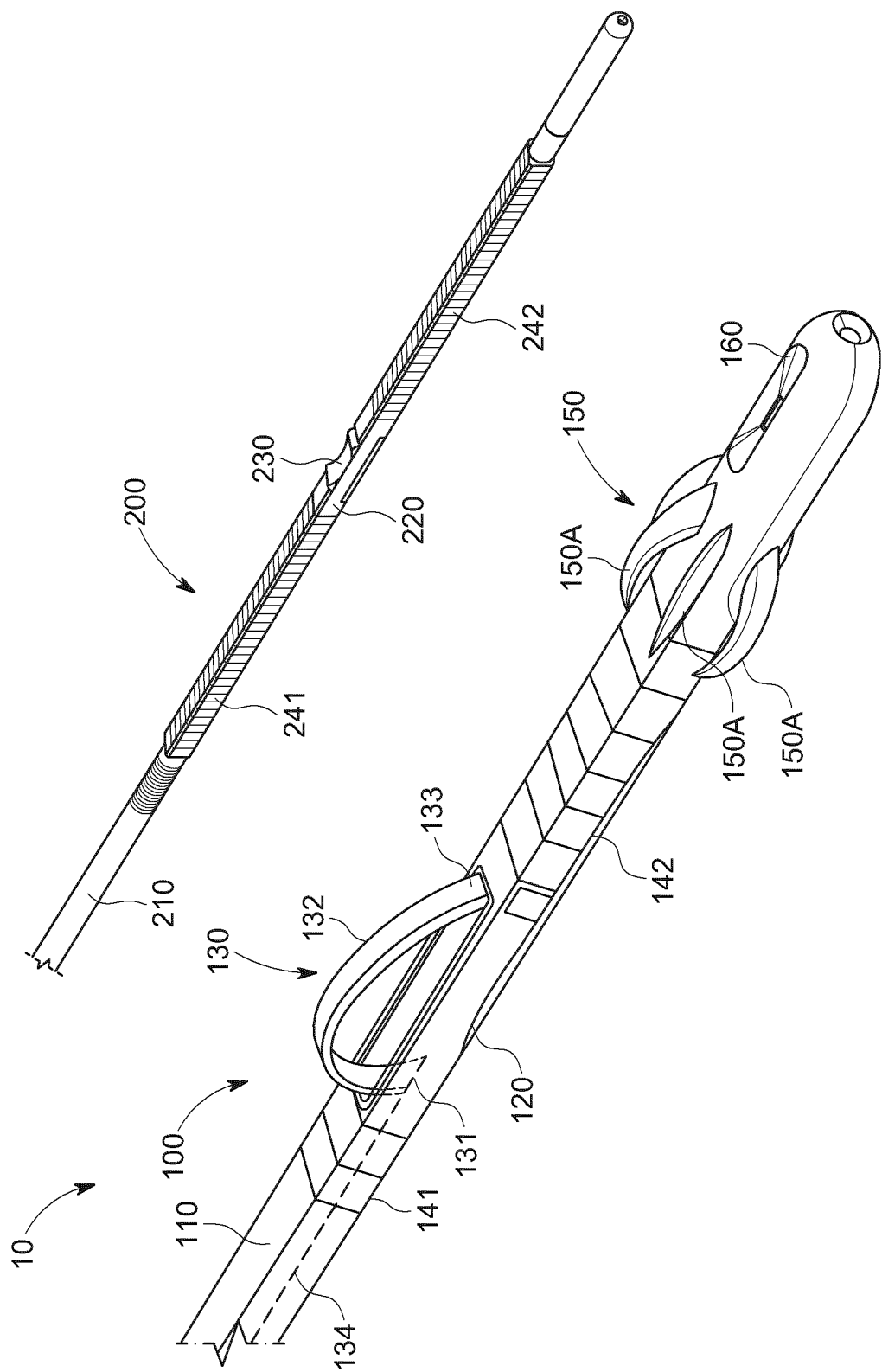
FIG. 1 shows a system for forming a fistula between two vessels comprising a first catheter and a second catheter according to the present disclosure.

FIG. 1 shows a catheter system 10 for forming a fistula. The system comprises a first catheter 100 and a second catheter 200 which can be used together to form a fistula between two vessels.

The first catheter 100 comprises a catheter shaft 110 with a housing 120, which may be disposed near a distal end of the catheter shaft 110. A rapid exchange tip 160 may be disposed at the distal end of the catheter shaft 110 to allow the first catheter 100 to track a guidewire and allow the first catheter 100 to be introduced and exchanged more quickly.

An electrode 130 is at least partially disposed in the housing 120 and may extend out of the housing 120 through an opening in the housing 120. The electrode 130 may have a proximal portion 131, an intermediate portion 132 and a distal portion 133. A connecting element 134 may be connected to the proximal portion 131 and may extend along the shaft 110 of the first catheter 100. The proximal end of the connecting element 134 may be connected to an RF energy source, for example an ESU pencil or RF generator, to allow RF energy to be supplied to the electrode 130. The proximal portion 131 may be fixed to the housing 120, for example, with a clamping mechanism or an adhesive. The intermediate portion 132 may extend out of the opening of the housing 120 and come into contact with the vessel wall for forming the fistula. The intermediate portion 132 may have a convex shape which extends away from the housing 120. The distance between the top of the intermediate portion 132 and the housing is the height of the electrode 130. The distal portion 133 may not be fixed such that it can move longitudinally relative to the housing 120. This may allow the electrode 130 to move between a radially contracted configuration and a radially expanded configuration.

FIG. 1 shows the electrode 130 in the radially expanded configuration, where the electrode 130 may extend radially further from the housing than in the radially contracted configuration. In the radially contracted configuration, the electrode 130 may be fully disposed within the housing 120 or it may extend from the housing 120 by a small distance.

The electrode 130 may be in the form of a ribbon wire and may be made from a number of suitable materials, such as one or more refractory metals. For example, the electrode 130 may comprise tungsten, molybdenum, niobium, tantalum, rhenium, or combinations and alloys thereof. The housing 120 may be made from a non-conductive ceramic material which can withstand the heat and plasma generated by the electrode 130.

The first catheter 100 further comprises a plurality of teeth 150 which extend radially from the catheter shaft 110 and may be disposed circumferentially around the catheter shaft 110. The plurality of teeth 150 are angled in a proximal direction to allow a venous valve to be cut and destroyed when the first catheter 100 is pulled in a proximal direction. Each of the plurality of teeth 150 may be disposed at the same longitudinal position, distally of the housing 120 and electrode 130. For example, the plurality of teeth may be disposed on the rapid exchange tip 160 or may be disposed between the housing 120 and the rapid exchange tip 160. FIG. 1 shows the first catheter 100 as having six teeth 150A, however, the first catheter 100 may comprise any number of suitable teeth, for example in the range of 2 to 10, such as 2 to 6 teeth. The teeth 150A may be fang-shaped and have a pointed end which points in the proximal direction. The teeth 150A may also be curved such that pointed end does not come into direct contact with the vessel wall and therefore vessel damage can be minimised. The teeth 150A may further comprise a cutting edge or a serrated edge (see FIGS. 2A-C) which may help the plurality of teeth 150 to better cut a venous valve. The plurality of teeth 150 may be made from any suitable material such as, for example, nitinol, tungsten, stainless steel or combinations and alloys thereof.

The first catheter 100 may further comprise a proximal set of magnets 141 and a distal set of magnets 142 which are disposed proximally and distally of the housing 120, respectively.

The second catheter 200 also comprises a catheter shaft 210 and a second housing 220 having a backstop 230 disposed at the distal end of the shaft 210. The backstop 230 may have a concave portion which is shaped complimentary to the convex shape of the electrode 130. The second catheter 200 and backstop 230 may also be made from a ceramic material to withstand the heat and plasma generated by the electrode 130. The second catheter 200 may also comprise a proximal set of magnets 241, disposed proximally of the housing 220, and a distal set of magnets 242, disposed distally of the housing 220.

Figure 2A:
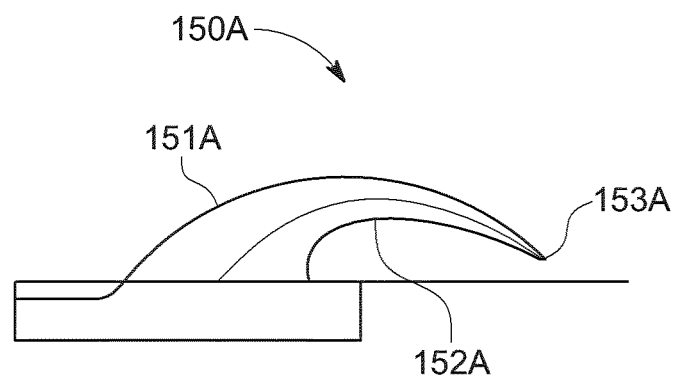
FIGS. 2A-C show different embodiments of the teeth of the first catheter according to the present disclosure.

FIG. 2A shows a side view of an embodiment of a tooth 150A. The tooth 150A may be one of the plurality of teeth 150 shown in FIG. 1.

The tooth 150A may be fang-shaped with a pointed end 153A which may point in a proximal direction. The tooth 150A may comprise a radially outer surface 151A and a radially inner surface 152A. The radially outer surface 151A may be curved and atraumatic such that it does not damage the vessel wall when it comes into contact with the vessel wall. The radially outer surface 151A may be curved such that the pointed end 153A is positioned radially closer to the catheter shaft 110 than the top portion or apex of the radially outer surface 151A. This means that the pointed end 153A will not pierce the vessel wall when advancing or retracting the first catheter 100 through the vessel. The radially inner surface 152A is also curved and may comprise a cutting edge, which may be non-serrated cutting edge, for cutting valve tissue which may allow the plurality of teeth 150 to better destroy a venous valve. The radially outer surface 151A and the radially inner surface 152A may meet at the pointed end 153A. The pointed end 153A may be a sharp pointed end which can pierce the tissue of a venous valve and therefore help to more effectively destroy the valve. Alternatively, the pointed end 153A may be an atraumatic pointed end. In that case only the cutting edge of the radially inner surface 152A would cut and destroy the venous valve. Having an atraumatic pointed end 153A may minimise damage to the vessel wall.

Figure 2B:
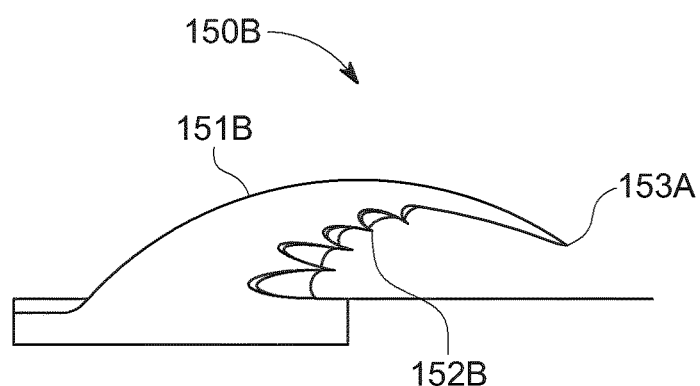

FIG. 2B shows a side view of an alternative embodiment of a tooth 150B, which may be one of the plurality of teeth 150 shown in FIG. 1.

The tooth 150B may also be fang-shaped with a pointed end 153B pointing in a proximal direction. The tooth 150B also comprises a curved radially outer surface 151B and a radially inner surface 152B which meet at the pointed end 153B. The tooth 150B differs from tooth 150A in that the radially inner surface 152B comprises a serrated edge for cutting valve tissue, rather than a non-serrated cutting edge. The pointed end 153B may similarly be a sharp pointed end for piercing the valve tissue or an atraumatic pointed end to minimise vessel damage.

Figure 2C:
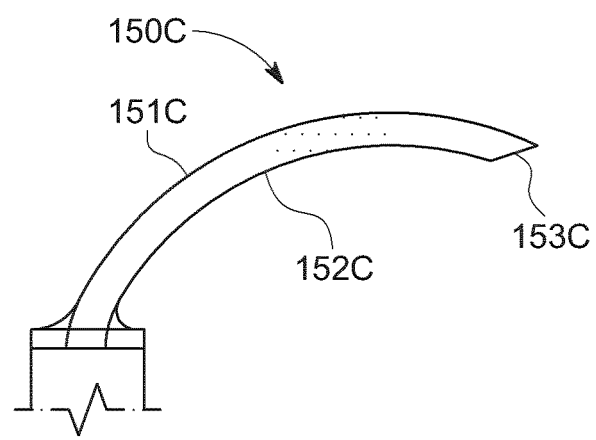

FIG. 2C shows a side view of another alternative embodiment of a tooth 150C, which may be one of the plurality of teeth 150 shown in FIG. 1.

The tooth 150C is not fang-shaped but rather in the shape of curved wire. The tooth 150C has a curved radially outer surface 151C and a curved radially inner surface 152C. The tooth 150C further has a pointed end 153C which may be pointing in a proximal direction. The radially inner surface 152C may not have a cutting edge or serrated edge. The pointed end 153C may therefore be sharp pointed end such that it can pierce venous valve tissue and effectively destroy a venous valve.

The first catheter 100 may comprise any of the teeth 150A, 150B, 150C as part of the plurality of teeth 150, either alone or in combination.

FIGS. 3A to 3E illustrate a method of using the system 10 in order to form a fistula between an artery A and a vein V of a patient and destroy the venous valves in the vein V such that the blood flow can circumvent a blockage B in the artery A. For the method described in FIGS. 3A-D, the direction D1 is a proximal direction in relation to the body of the patient, not the catheter. The direction D2 is a distal direction in relation to the body of the patient, not the catheter.

In order to form a fistula between the artery A and vein V, the first catheter 100 is introduced into the vein V through a first access site and the second catheter 200 is introduced into the artery A through a second access site.

Figure 3A:
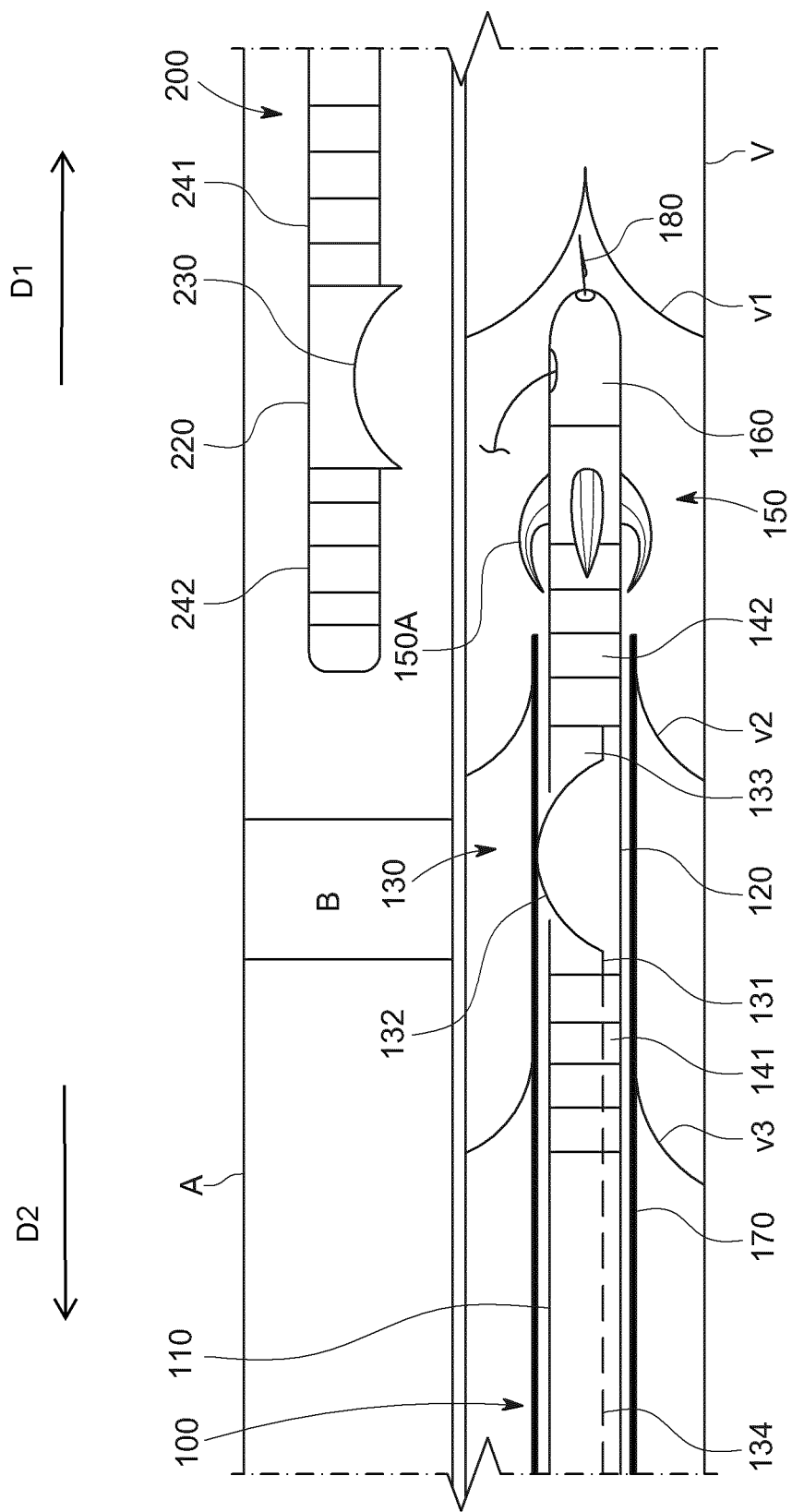

As shown in FIG. 3A, the first catheter 100 and the second catheter 200 are then advanced through the vein V and artery A, respectively, until they reach a treatment site where the fistula is to be formed. The first access site may be positioned distally of the blockage B, such that the first catheter 100 is advanced through the vein V in a proximal direction D1. The second access site may be positioned proximally of the blockage B such that the second catheter 200 is advanced towards the blockage B in a distal direction D2. The treatment site where the fistula is to be formed may be proximal of the blockage to allow the arterial blood flow to circumvent the blockage B.

The first catheter 100 may be introduced into the vein V and advanced to the treatment site with the electrode 130 in the radially contracted configuration. In order to maintain the electrode 130 in the radially contracted configuration, the first catheter 100 may be disposed within a sheath 170 which compresses the electrode 130. This allows the first catheter 100 to more easily advance through the vessel due to the lower profile. The first catheter 100 may also be advanced along a guidewire 180. Similarly, the second catheter 200 may also be advanced along a guidewire (not shown).

Figure 3B:
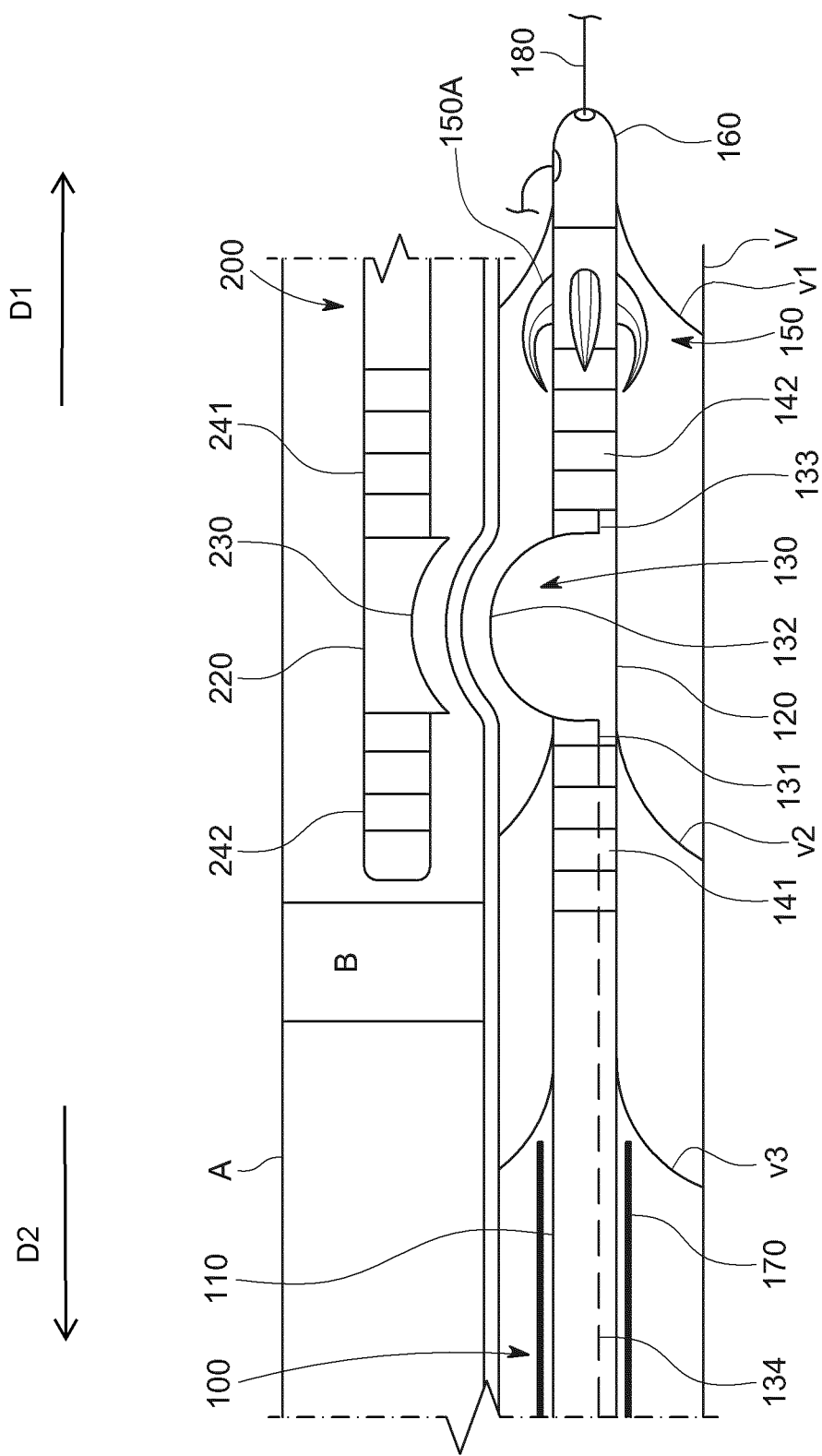

As shown in FIG. 3B, once the first catheter 100 and the second catheter 200 are positioned at the treatment site, where the fistula is to be formed, the sheath 170 may be pulled back to allow the electrode 130 to expand from the radially contracted configuration to the radially expanded configuration. The proximal set of magnets 141 of the first catheter 100 may align with the distal set of magnets 242 of the second catheter 200. Similarly, the distal set of magnets 142 of the first catheter 100 may align with the proximal set of magnets 241 of the second catheter 200. The alignment of the magnets results in accurate alignment of the electrode 130 with the concave portion of the backstop 230. The backstop 230 is configured to compress the vessel walls in a localised region for ablation by the electrode 130 of the first catheter 100. The attraction of the magnets also causes the first catheter 100 and second catheter 200 to be pulled closer together, thereby compressing the vessel walls of the artery A and vein V, resulting in more effective fistula formation.

Once the electrode 130 and the backstop 230 are aligned at the treatment site, RF energy is supplied to the electrode 130 from the RF energy source via the connecting element 134. The RF energy causes the electrode 130 to heat up and generate a plasma. The plasma causes rapid dissociation of molecular bonds in organic compounds and allows the electrode 130 to cut through the venous and arterial vessel walls until it hits the backstop 230 to form a fistula F.

Figure 3C:
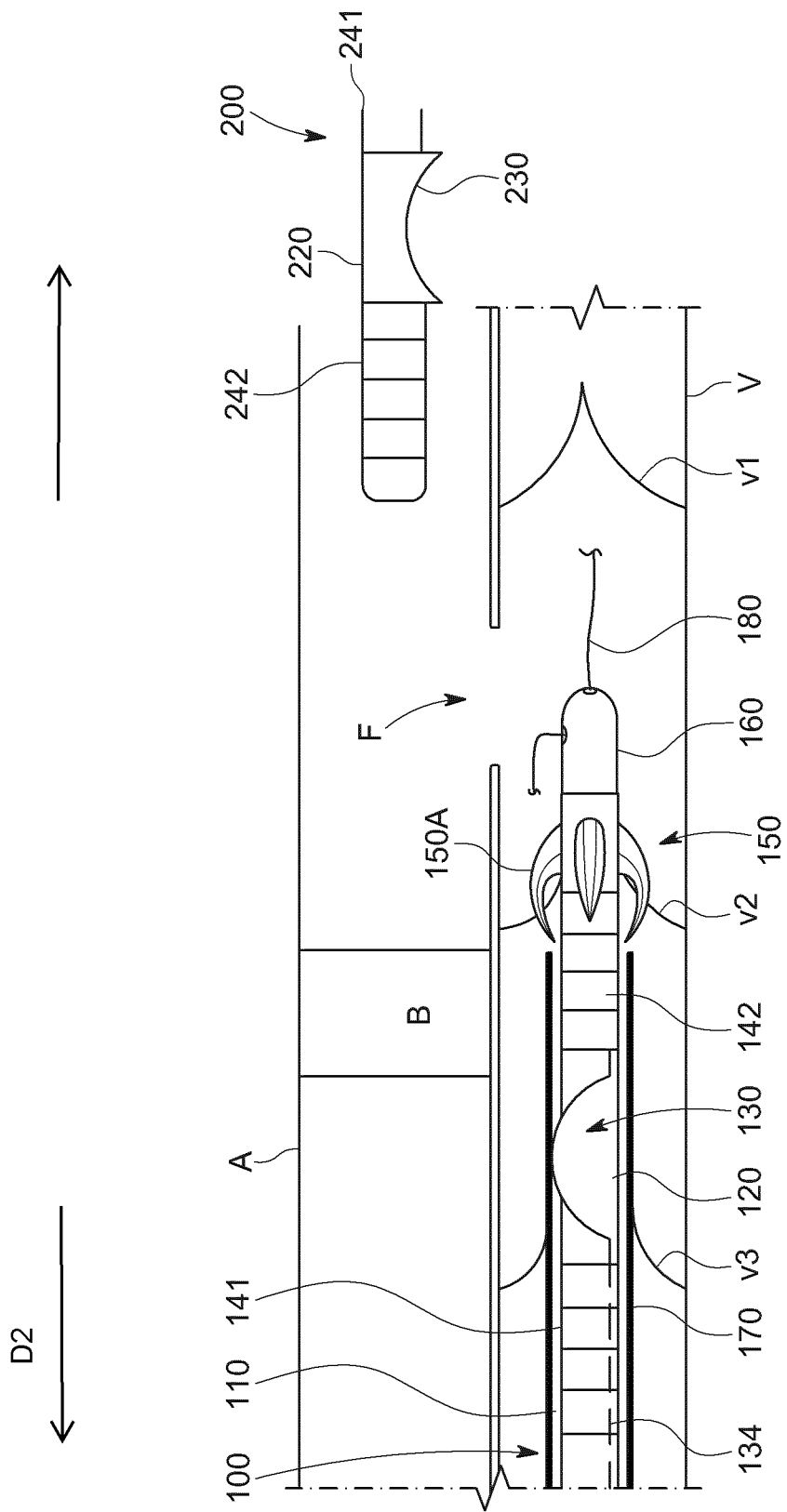

FIG. 3C shows the fistula F formed between the artery A and vein V. Blood can now flow from the arty A into the vein V. However, the vein V comprises a number of venous valves, such as v1, v2, v3, which block retrograde blood flow through the vein V and therefore prevent arterial blood flow from circumventing the blockage B. In order to perform a successful deep vein arterialization or endovascular bypass procedure, the venous valves disposed distally of fistula F, e.g. valves v2 and v3, need to be destroyed.

Once the fistula F is formed, the second catheter 200 is pulled back in a proximal direction D1 and may be removed from the artery A. The sheath 170 may be pushed over the electrode 130 to move the electrode 130 from the radially expanded position back to the radially contracted position. As shown in FIG. 3C, the first catheter 100 is then pulled in distal direction D2 until the plurality of teeth 150 are in contact with a venous valve to be destroyed, e.g. valve v2.

The shape of the plurality of teeth 150, specifically, the curved outer surface 151A of each tooth 150A, means that the wall of the vein V is not damaged when the first catheter 100 is pulled in distal direction D2. Once the plurality of teeth 150 are in contact with the valve v2, the pointed ends 153A of each tooth 150A may engage or pierce the valve tissue. The first catheter may then be further pulled in distal direction D2, which causes the inner surface 152A with the cutting edge to cut the valve v2 and thereby render it incompetent such that it can no longer block retrograde blood flow through the vein V.

Figure 3D:
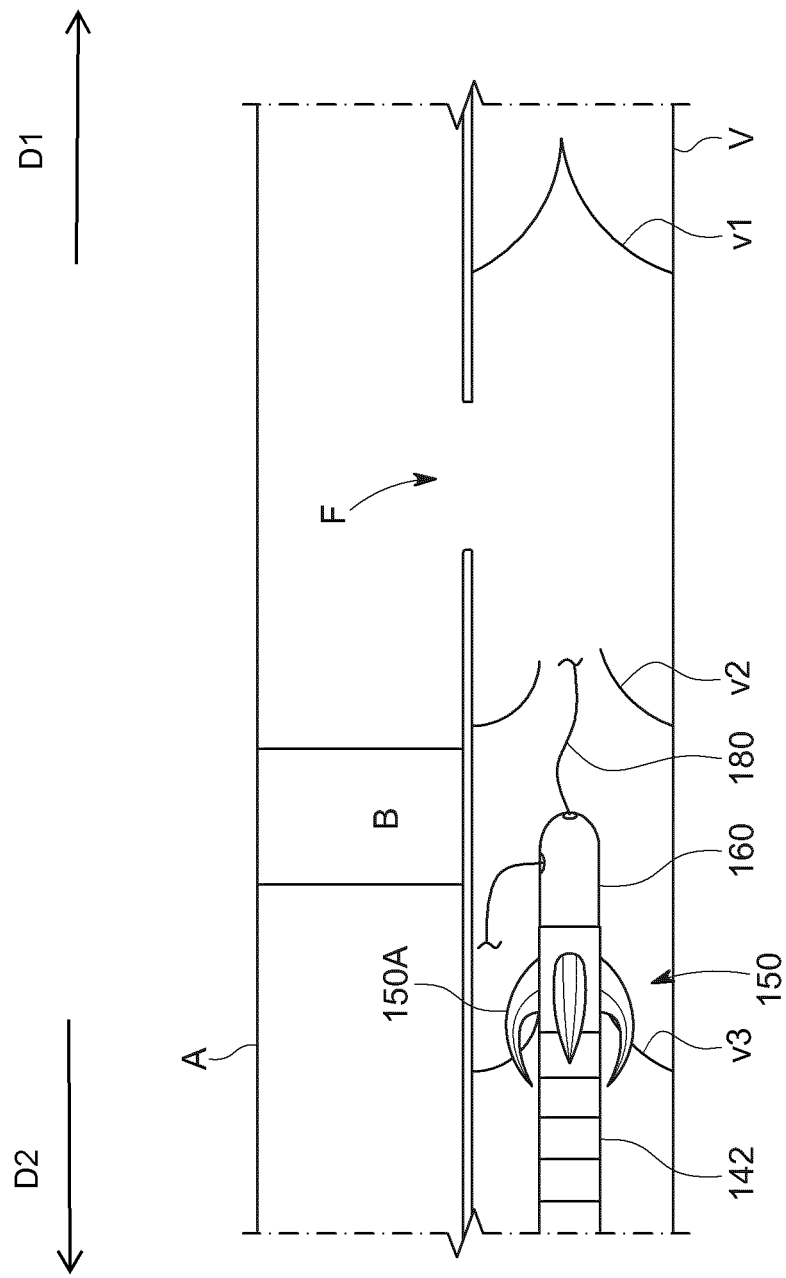

As shown in FIG. 3D, the first catheter is then pulled further in a distal direction D2 and the valve destruction process can be repeated for any further venous valves which need to be destroyed, such as valve v3. Once all of the required venous valves are destroyed, the first catheter 100 may be removed from the vein V.

FIG. 3E shows the artery A and vein V after the first catheter 100 and the second catheter 200 have been removed. The fistula F connects the artery A and vein V at a position proximal to the blockage B. The venous valves v2 and v3 which are positioned distally of the fistula F are destroyed and can no longer prevent retrograde flow of blood. Blood can now flow from the artery A through the fistula F into the vein V and in a retrograde or distal direction D2 through valves v2 and v3 to circumvent the blockage B.

When performing a deep vein arterialization (DVA) procedure, a stent may be placed within the fistula F to stabilise the fistula F. When performing an endovascular bypass procedure, a second fistula may be formed distally of the blockage B in a similar manner as explained with respect to FIG. 3B above. A stent graft may then be placed through the first and second fistulas via the vein V, such that the blood flow can circumvent the blockage B.

Figure 4:
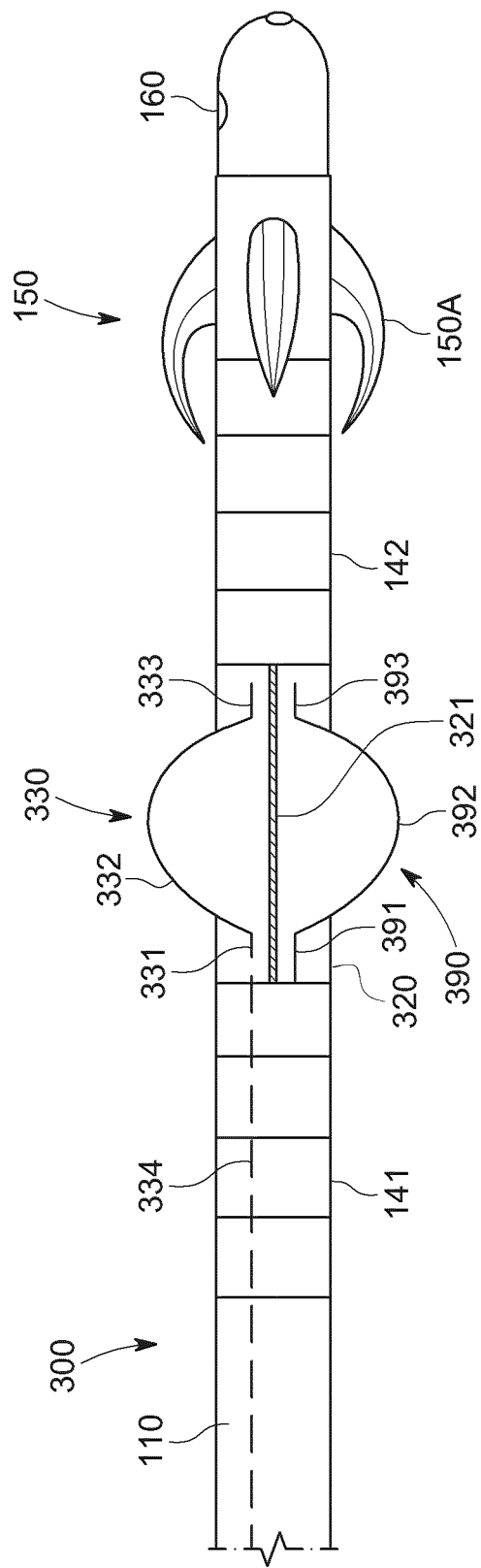
FIG. 4 shows an alternative embodiment of a first catheter according to the present disclosure.

FIG. 4 shows a side view of an alternative embodiment of a first catheter 300. The first catheter 300 may be used together with the second catheter 200 of FIG. 1 to form a fistula between two vessels and destroy venous valves.

The first catheter 300 is similar to the first catheter 100 of FIG. 1 and the same reference signs are used to denote identical features.

The first catheter 300 differs from first catheter 100 in that it further comprises a stabilizing element 390 which is at least partially disposed in the housing 320. The stabilizing element 390 may be disposed opposite the electrode 130 and separated from the electrode 130 with a ceramic spacer 321, which may protect the stabilizing element 390 from the heat and plasma generated by the electrode 130. The stabilizing element 390 may comprise a proximal portion 391, an intermediate portion 392 having a convex shape and a distal portion 393. The proximal portion 391 may be fixed to the housing 320 while the distal portion 393 may be free to move within the housing 320 to allow the stabilizing element to move between a radially contracted configuration and a radially expanded configuration.

The stabilizing element 390 may help to stabilize the electrode 130 during the fistula formation process. The stabilizing element 390 may be in the radially expanded configuration during the fistula formation process such that it comes into contact with and pushes against the opposite side of the vessel wall as the electrode 330. This pushes the electrode 330 into closer contact with the vessel wall and against backstop 230 which results in more effective fistula formation.

The stabilizing element 390 may also help to stabilize the first catheter during the valve destruction process. The electrode 330 and the stabilizing element 390 may be in the radially expanded configuration during the valve destruction process, for example, by pulling back the sheath 170. The electrode 330 and the stabilizing element 390 help to centre the first catheter 100 within the vessel. When the first catheter 100 is pulled distally, the plurality of teeth 150 are centred and more stable when they engage the valve tissue. This may result in more effective valve destruction and minimise damage to the vessel walls.

Various modifications will be apparent to those skilled in the art.

The electrode 130 is not limited to a ribbon wire, but may be any other type of suitable wire, for example, a cylindrical wire or oval wire.

The electrode 130 is not limited to a convex shape, but may be any other type of suitable shape, for example a rectangular shape, trapezoidal shape or triangular shape.

The plurality of teeth may be disposed on the housing 120, on the rapid exchange tip 160 or between the housing 120 and rapid exchange tip 160.

The plurality of teeth 150 may be disposed proximal of the housing 120.

The plurality of teeth 150 may not be fang-shaped, but may be any other suitable shape for engaging and destroying a venous valve.

The plurality of teeth 150 may not comprise a cutting edge or serrated edge at the inner surface.

The first catheter 100 may not comprise a proximal set of magnets 141 and/or a distal set of magnets 142. Similarly, the second catheter 200 may not comprise a proximal set of magnets 241 or a distal set of magnets 242.

The backstop 230 of the second catheter 200 is not limited to a concave shape but may also be any suitable shape. For example, the backstop 230 may be recessed or protruding and could have a concave, convex or rectangular shape.

The housing 120 of the catheter is not limited to a ceramic material and may be made from any suitable material which can withstand the heat and plasma generated by the electrode 130.

The first catheter 100 may not comprise a rapid exchange tip 160.

The first catheter 100 may not comprise a sheath 170. The electrode 130 may be moved between a radially contracted and a radially expanded configuration through a pull wire, for example.

The electrode 130 may not have a radially contracted and a radially expanded configuration. Rather the electrode may only have one fixed configuration.

The electrode 330 and stabilizing element 390 are not limited to being positioned on opposite sides of the housing 320, but may be positioned at different radial angles to each other.

The catheter 300 may not comprise a ceramic spacer 321.

All of the above are fully within the scope of the present disclosure and considered to form the basis for alternative embodiments in which one or more combinations of the above described features are applied, without limitation to the specific combination disclosed above.

In light of this, there will be many alternatives which implement the teaching of the present disclosure. It is expected that one skilled in the art will be able to modify and adapt the above disclosure to suit its own circumstances and requirements within the scope of the present disclosure, while retaining some or all technical effects of the same, either disclosed or derivable from the above, in light of his common general knowledge in this art. All such equivalents, modifications or adaptations fall within the scope of the present disclosure.

The invention claimed is:

1. A system for forming a fistula between two vessels, the system comprising a first catheter, the first catheter comprising:
    a catheter shaft with a housing;
        an electrode disposed at least partially within the housing, the electrode comprising a distal portion, a proximal portion and an intermediate portion therebetween for contacting a vessel wall and forming the fistula; and
        a plurality of teeth for cutting a venous valve, wherein the plurality of teeth extend radially from the catheter shaft and are angled in a proximal direction, wherein each of the plurality of teeth includes a radially outer atraumatic surface.

2. The system of claim 1, wherein the plurality of teeth are positioned distally of the electrode.

3. The system of claim 1, wherein the plurality of teeth comprise in the range of 2 to 8 teeth.

4. The system of claim 1, wherein the plurality teeth are spaced around the circumference of the catheter shaft.

5. The system of claim 1, wherein the plurality of teeth are positioned at the same longitudinal position as one another.

6. The system of claim 1, wherein the plurality of teeth are fang-shaped.

7. The system of claim 6, wherein the plurality of fang-shaped teeth have a radially outer surface and a radially inner surface which meet at a pointed end.

8. The system of claim 7, wherein the radially outer surface is curved.

9. The system of claim 7, wherein the plurality of fang-shaped teeth have a sharp pointed end for piercing a venous valve.

10. The system of claim 7, wherein the radially inner surface comprises a cutting edge or a serrated edge.

11. The system of claim 10, wherein the plurality of fang-shaped teeth have an atraumatic pointed end.

12. The system of claim 1, wherein the plurality of teeth have an abrasive surface.

13. The system of claim 1, wherein the first catheter comprises a rapid exchange distal tip.

14. The system of claim 13, wherein the plurality of teeth are positioned on the rapid exchange distal tip or between the housing and the rapid exchange distal tip.

15. The system of claim 1, wherein the plurality of teeth are positioned on the housing.

16. The system of claim 1, wherein the first catheter further comprises a convex stabilizing element, extending from the housing.

17. The system of claim 16, wherein the convex stabilizing element is positioned opposite the electrode.

18. The system of claim 1, wherein the electrode has a radially expanded configuration and a radially contracted configuration.

19. The system of claim 1, wherein the electrode comprises a leaf spring.

20. The system of claim 1, wherein the electrode has a convex portion.

* * * * *